US011949822B2

(12) United States Patent
Kurihara

(10) Patent No.: US 11,949,822 B2
(45) Date of Patent: *Apr. 2, 2024

(54) INFORMATION PROCESSING APPARATUS THAT DETERMINES WHETHER A FORMAT OF NEAR FIELD COMMUNICATION TAG DATA IS APPROPRIATE FOR SEARCHING PRINTER, METHOD OF CONTROLLING THE SAME, AND NON-TRANSITORY COMPUTER-READABLE MEDIUM

(71) Applicant: Canon Kabushiki Kaisha, Tokyo (JP)

(72) Inventor: Shukei Kurihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,303

(22) Filed: Sep. 6, 2022

(65) Prior Publication Data

US 2022/0417369 A1 Dec. 29, 2022

Related U.S. Application Data

(63) Continuation of application No. 17/308,385, filed on May 5, 2021, now Pat. No. 11,483,438, which is a
(Continued)

(30) Foreign Application Priority Data

Jul. 16, 2014 (JP) ................. 2014-146299

(51) Int. Cl.
*H04N 1/00* (2006.01)
*G06F 3/12* (2006.01)

(52) U.S. Cl.
CPC ....... *H04N 1/00214* (2013.01); *G06F 3/1204* (2013.01); *G06F 3/1207* (2013.01);
(Continued)

(58) Field of Classification Search
None
See application file for complete search history.

(56) References Cited

U.S. PATENT DOCUMENTS 8,947,712 B2 2/2015 Arai
9,083,837 B2 7/2015 Tredoux et al.
(Continued)

FOREIGN PATENT DOCUMENTS

CN 1965535 A 5/2007
CN 101552975 A 10/2009
(Continued)

OTHER PUBLICATIONS

Chinese Office Action issued in corresponding Chinese Application No. 201510390918.6 dated Sep. 8, 2017.
(Continued)

*Primary Examiner* — Haris Sabah
(74) *Attorney, Agent, or Firm* — Venable LLP

(57) ABSTRACT

An information processing apparatus capable of executing near field wireless communication, comprises: a display unit configured to display a screen; an obtaining unit configured to obtain identification information regarding a device from a near field wireless communication tag with use of the near field wireless communication; a selection unit configured, in a case where the obtaining unit obtained the identification information, to select one of first processing for connecting to the device indicated by the identification information and second processing for connecting to the device indicated by the identification information and sending data to the device, based on a type of screen being displayed by the display unit; and a processing unit configured to execute the processing selected by the selection unit.

51 Claims, 7 Drawing Sheets

Related U.S. Application Data continuation of application No. 16/807,343, filed on Mar. 3, 2020, now Pat. No. 11,019,229, which is a continuation of application No. 15/977,264, filed on May 11, 2018, now Pat. No. 10,623,592, which is a continuation of application No. 15/411,569, filed on Jan. 20, 2017, now Pat. No. 9,996,307, which is a continuation of application No. 15/041,633, filed on Feb. 11, 2016, now Pat. No. 10,136,004, which is a continuation of application No. 14/796,693, filed on Jul. 10, 2015, now Pat. No. 9,292,233.

(52) U.S. Cl.
CPC .......... *G06F 3/1231* (2013.01); *G06F 3/1236* (2013.01); *G06F 3/1292* (2013.01); *H04N 1/00307* (2013.01); *H04N 1/00342* (2013.01); *H04N 1/00411* (2013.01); *H04N 1/0044* (2013.01); *H04N 2201/006* (2013.01); *H04N 2201/0094* (2013.01)

(56) References Cited

U.S. PATENT DOCUMENTS

| | | | |
|---|---|---|---|
| 9,229,666 B2* | 1/2016 | Oguma | G06F 3/1231 |
| 9,385,784 B2 | 7/2016 | Kim et al. | |
| 2004/0235455 A1 | 11/2004 | Jiang | |
| 2009/0036056 A1 | 2/2009 | Oshima et al. | |
| 2011/0183614 A1 | 7/2011 | Tamura | |
| 2013/0070297 A1 | 3/2013 | Kato | |
| 2013/0141747 A1 | 6/2013 | Oba et al. | |
| 2013/0258390 A1 | 10/2013 | Suzuki et al. | |
| 2014/0027506 A1 | 1/2014 | Heo et al. | |
| 2014/0094117 A1* | 4/2014 | Rajendran | H04W 12/35 455/41.1 |
| 2014/0168681 A1 | 6/2014 | Nakamura | |
| 2014/0240758 A1 | 8/2014 | Yoshimura | |
| 2014/0253964 A1 | 9/2014 | Asai | |
| 2014/0340701 A1 | 11/2014 | Okamura | |
| 2014/0342665 A1 | 11/2014 | Amano | |
| 2014/0355047 A1* | 12/2014 | Lee | G06F 3/1292 358/1.15 |
| 2014/0355063 A1* | 12/2014 | Jang | H04L 67/34 358/1.15 |
| 2015/0116760 A1 | 4/2015 | Kim | |
| 2015/0268049 A1 | 9/2015 | Hasegawa | |

FOREIGN PATENT DOCUMENTS

| | | |
|---|---|---|
| CN | 101800835 A | 8/2010 |
| CN | 103873136 A | 6/2014 |
| CN | 103905634 A | 7/2014 |
| JP | 2007251920 A | 9/2007 |
| JP | 2009-218845 A | 9/2009 |
| JP | 2011-155593 A | 8/2011 |
| JP | 2013157736 A | 8/2013 |
| JP | 2013-187568 A | 9/2013 |
| JP | 2013214139 A | 10/2013 |
| JP | 2014-120915 A | 6/2014 |
| JP | 2014235472 A | 12/2014 |
| KR | 1020060105219 A | 10/2006 |
| WO | 2007/112787 A1 | 10/2007 |

OTHER PUBLICATIONS

Japanese Office Action issued in corresponding Japanese Patent Application No. 2014-146299, dated Jan. 30, 2017.
Japanese Office Action Issued in corresponding Japanese Application No. 2017168807 dated Jun. 15, 2018.
Chinese Office Action issued in corresponding Chinese Application No. 201811021041.3 dated Jun. 19, 2019.
Japanese Office Action issued in corresponding Japanese Application No. 2018-175321 dated Aug. 9, 2019.
Japanese Office Action issued in corresponding Japanese Patent Application No. 2021-215134, dated Mar. 27, 2023.

* cited by examiner

INFORMATION PROCESSING APPARATUS THAT DETERMINES WHETHER A FORMAT OF NEAR FIELD COMMUNICATION TAG DATA IS APPROPRIATE FOR SEARCHING PRINTER, METHOD OF CONTROLLING THE SAME, AND NON-TRANSITORY COMPUTER-READABLE MEDIUM

CROSS-REFERENCE TO RELATED APPLICATIONS

This application is a Continuation of U.S. patent application Ser. No. 17/308,385, filed May 5, 2021, which is a Continuation of U.S. patent application Ser. No. 16/807,343, filed Mar. 3, 2020, issued as U.S. Pat. No. 11,019,229 on May 25, 2021, which is a Continuation of U.S. patent application Ser. No. 15/977,264, filed May 11, 2018, issued as U.S. Pat. No. 10,623,592 on Apr. 14, 2020, which is a Continuation of U.S. patent application Ser. No. 15/411,569, filed Jan. 20, 2017, issued as U.S. Pat. No. 9,996,307 on Jun. 12, 2018, which is a Continuation of U.S. patent application Ser. No. 15/041,633, filed Feb. 11, 2016, issued as U.S. Pat. No. 10,136,004 on Nov. 20, 2018, which is a Continuation of U.S. patent application Ser. No. 14/796,693, filed Jul. 10, 2015, now U.S. Pat. No. 9,292,233, which claims priority to Japanese Patent Application No. 2014-146299, filed Jul. 16, 2014, the entire disclosures of which are all hereby incorporated by reference herein.

BACKGROUND OF THE INVENTION

Field of the Invention

The present invention relates to an information processing apparatus capable of executing wireless communication, a method of controlling the same, and a non-transitory computer-readable medium.

Description of the Related Art

Some apparatuses such as MFPs (Multi Function Peripherals) are provided with an NFC (Near Field Communication) tag. The NFC tag includes information specifying the MFP to which it is attached, such as connection information (an IP address or a MAC address).

Meanwhile, there are cases where mobile applications for printing images or documents operate on mobile terminals that can read the content of NFC tags. With such mobile terminals, there is known to be a handover technique that employs NFC tag information, in which a mobile application is started up, an image is displayed, and the mobile terminal is touched against an NFC tag (hereinafter, called an "NFC touch") to read its information (see Japanese Patent Laid-Open No. 2013-157736). It is possible to switch the wireless communication LAN AP (Access Point) to which the mobile terminal is to be connected in accordance with the NFC tag information, and perform printing with the handover destination MFP as the print destination.

Also, a technique has been disclosed in which it is determined whether or not the state of the MFP is an error state, and a function is executed only in the case of a non-error state (see Japanese Patent Laid-Open No. 2013-214139).

If an NFC touch is performed while an image is displayed in a preview screen on a mobile terminal, printing is executed, whereas if an NFC touch is performed while a screen other than a preview screen is displayed, the image to be printed has not been determined, and therefore printing cannot be performed. On the other hand, if no operation is performed when an NFC touch is performed while a screen other than a preview screen is displayed, a user who desires to perform an operation other than printing, such as performing a scanning operation with a mobile application, needs to manually connect to a wireless communication LAN and select an MFP, which is troublesome.

SUMMARY OF THE INVENTION

According to one aspect of the present invention, there is provided an information processing apparatus capable of executing near field wireless communication, comprising: a display unit configured to display a screen; an obtaining unit configured to obtain identification information regarding a device from a near field wireless communication tag with use of the near field wireless communication; a selection unit configured, in a case where the obtaining unit obtained the identification information, to select one of first processing for connecting to the device indicated by the identification information and second processing for connecting to the device indicated by the identification information and sending data to the device, based on a type of screen being displayed by the display unit; and a processing unit configured to execute the processing selected by the selection unit.

According to another aspect of the present invention, there is provided an information processing apparatus capable of executing near field wireless communication, comprising: a display unit configured to display a screen; an obtaining unit configured to obtain identification information regarding a device from a near field wireless communication tag with use of the near field wireless communication; a selection unit configured, in a case where the obtaining unit obtained the identification information, to select one of first processing for specifying the device indicated by the identification information as a connection destination and second processing for sending data to the device indicated by the identification information, based on a type of screen being displayed by the display unit; and a processing unit configured to execute the processing selected by the selection unit.

According to another aspect of the present invention, there is provided a method of controlling an information processing apparatus, comprising: a display step of displaying a screen; an obtaining step of obtaining identification information regarding a device; a selection step of selecting, in a case where the identification information was obtained in the obtaining step, one of first processing for connecting to the device indicated by the identification information and second processing for connecting to the device indicated by the identification information and sending data to the device, based on a type of screen being displayed; and a control step of controlling the information processing apparatus so as to execute the processing selected in the selection step.

According to another aspect of the present invention, there is provided a method of controlling an information processing apparatus, comprising: a display step of displaying a screen; an obtaining step of obtaining identification information regarding a device; a selection step of selecting, in a case where the identification information was obtained in the obtaining step, one of first processing for specifying the device indicated by the identification information as a connection destination and second processing for sending data to the device indicated by the identification information, based on a type of screen being displayed; and a control step of controlling the information processing apparatus so as to execute the processing selected in the selection step.

According to another aspect of the present invention, there is provided a non-transitory computer-readable medium storing a program for causing a computer to execute a method for controlling an information processing apparatus, the method comprising: a display step of displaying a screen; an obtaining step of obtaining identification information regarding a device; a selection step of selecting, in a case where the identification information was obtained in the obtaining step, one of first processing for connecting to the device indicated by the identification information and second processing for connecting to the device indicated by the identification information and sending data to the device, based on a type of screen being displayed; and a control step of controlling the information processing apparatus so as to execute the processing selected in the selection step.

According to another aspect of the present invention, there is provided a non-transitory computer-readable medium storing a program for causing a computer to execute a method for controlling an information processing apparatus, the method comprising: a display step of displaying a screen; an obtaining step of obtaining identification information regarding a device; a selection step of selecting, in a case where the identification information was obtained in the obtaining step, one of first processing for specifying the device indicated by the identification information as a connection destination and second processing for sending data to the device indicated by the identification information, based on a type of screen being displayed; and a control step of controlling the information processing apparatus so as to execute the processing selected in the selection step.

According to the present invention, processing executed based on information read from an NFC tag is switched according to the application screen, and the user can smoothly perform operations with respect to an MFP.

Further features of the present invention will become apparent from the following description of exemplary embodiments with reference to the attached drawings.

DESCRIPTION OF THE EMBODIMENTS

Hereinafter, embodiments for carrying out the present invention will be described with reference to the drawings.

It is to be understood that the following embodiments are not intended to limit the claims of the present invention, and that not all of the combinations of the aspects that are described according to the following embodiments are necessarily required with respect to the method to solve the problems according to the present invention.

First Embodiment

System Configuration

Figure 1:
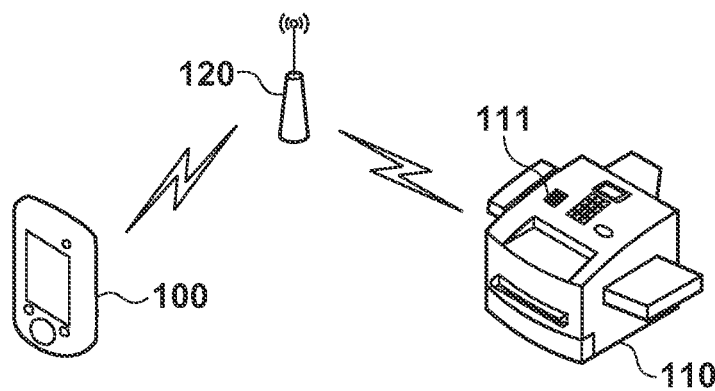
FIG. 1 is a diagram showing an example of a configuration of a communication system.

The following describes an example of the configuration of a communication system according to the present invention with reference to FIG. 1. The communication system according to the present embodiment includes a mobile terminal 100, an MFP 110, an NFC tag 111, and an access point 120.

The MFP 110 executes wireless communication with an access point 120 over a wireless communication LAN or the like. Note that the communication between the access point 120 and the MFP 110 may be wired communication employing a LAN cable or the like. Also, although an MFP is described as an example of a device that performs communication with the mobile terminal 100 in the present embodiment, the present invention is not limited to this, and the device may be another apparatus such as a single-function network printer.

The mobile terminal 100 can execute wireless communication over a wireless communication LAN or the like. When a user inputs information such as the SSID of the access point 120 and a security key to the mobile terminal 100, the mobile terminal 100 connects to the access point 120, and then the mobile terminal 100 can communicate with the MFP 110 via the access point 120. The mobile terminal 100 can send a print job to an external apparatus such as the MFP 110 via the access point 120. Upon receiving the print job, the MFP 110 executes printing based on the print job.

Also, the mobile terminal 100 and the MFP 110 can execute near field wireless communication such as NFC (Near Field Communication). In the case of the present embodiment, the MFP 110 includes the NFC tag 111, and information for connecting to the access point 120 (the SSID of the access point 120 and a security key) is stored in the NFC tag 111. The mobile terminal 100 can obtain the information in the NFC tag 111 of the MFP 110 using NFC, and connect to the access point 120 based on the obtained information. Switching the connection to wireless communication in a wireless communication LAN or the like using information obtained by near field wireless communication such as NFC in this way is called a "handover". Performing a handover eliminates the trouble of the need for information for connecting to the access point 120 (the SSID of the access point 120 and a security key) to be input to the mobile terminal 100 by the user.

Hardware Configuration

Figure 2:
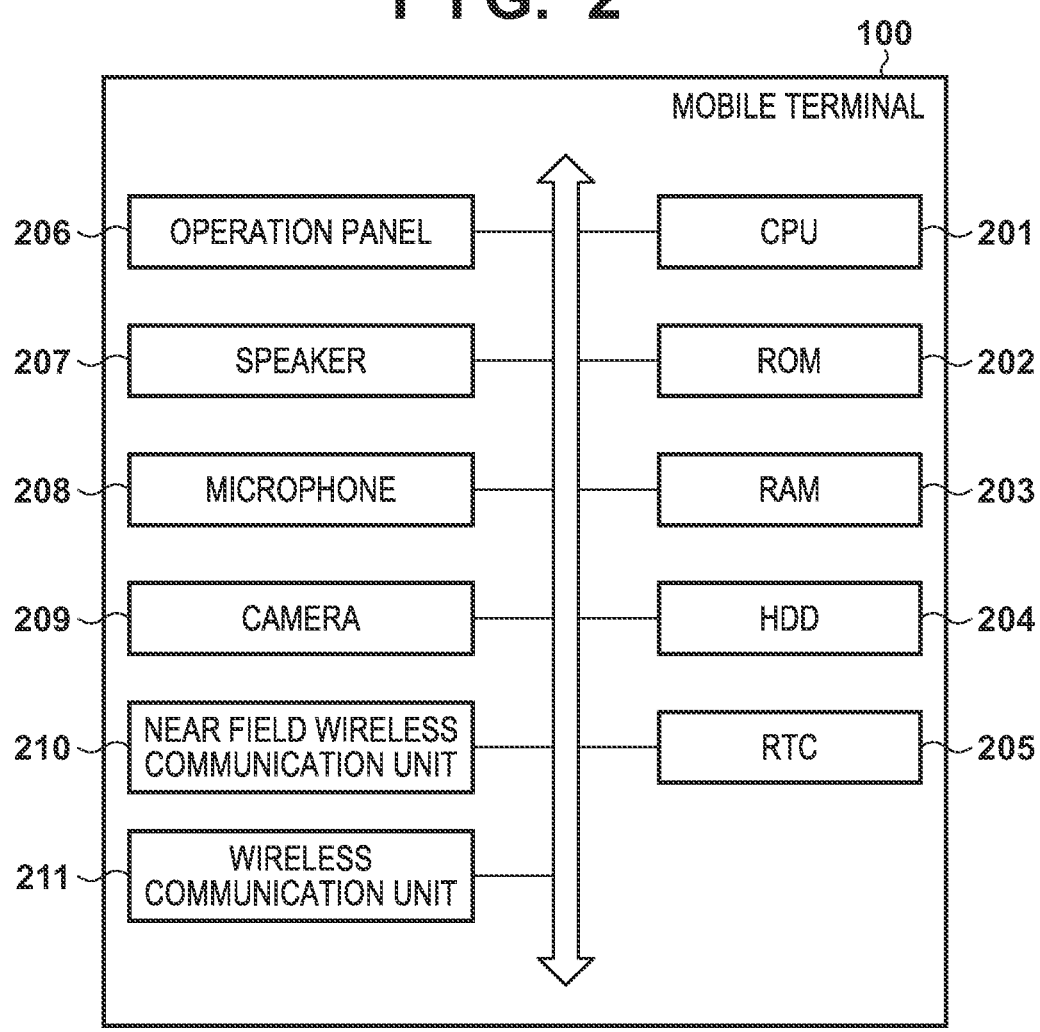
FIG. 2 is a diagram showing an example of a hardware configuration of a mobile terminal.

The following describes an example of the hardware configuration of the mobile terminal 100 with reference to FIG. 2. Note that although an apparatus such as a smartphone or a tablet PC is envisioned as the mobile terminal 100 in the present embodiment, the present invention is applicable to another apparatus, as long as it is an information processing apparatus that can execute wireless communication.

A CPU 201 reads out control programs stored in a ROM 202, and executes various types of processing for controlling operations of the mobile terminal 100. The ROM 202 is a nonvolatile storage unit, and stores control programs. A RAM 203 is a volatile storage unit, and is used as a main memory for the CPU 201, and as a temporary storage area such as a work area. An HDD 204 stores various types of data such as photographs and electronic documents. Also, an OS (Operating System) 411 and an MFP application 400 are also stored in the HDD 204. An RTC (Real Time Clock) 205 measures time.

In the case of the mobile terminal 100, one CPU 201 executes the various processes shown in the flowcharts described later, but another mode may be employed. For example, the processes shown in the flowcharts described later may be executed by multiple CPUs working in cooperation.

An operation panel 206 includes a touch panel function capable of detecting touch operations performed by the user, and displays various types of screens provided by the OS 411 and the MFP application 400. The user can input desired operation instructions to the mobile terminal 100 by performing touch operations on the operation panel 206. Note that a configuration is possible in which the mobile terminal 100 includes hardware keys (not shown), and the user inputs operation instructions to the mobile terminal 100 using the hardware keys.

A speaker 207 and a microphone 208 are used in audio-related applications, such as the case where the user calls another mobile terminal or a fixed-line telephone. A camera 209 performs imaging in accordance with an imaging instruction from the user. A photograph (image) captured by the camera 209 is stored in a predetermined area of the HDD 204.

A near field wireless communication unit 210 executes near field wireless communication such as NFC with the NFC tag 111 included in the MFP 110. When the user brings the mobile terminal 100 close to the NFC tag 111, near field wireless communication is established between the near field wireless communication unit 210 and the NFC tag 111 of the MFP 110, and the near field wireless communication unit 210 obtains the information in the NFC tag 111. Note that the near field wireless communication executed by the near field wireless communication unit 210 is not limited to NFC, and a communication method employing another short-range communication standard such as Bluetooth (registered trademark) may be used.

A wireless communication unit 211 executes wireless communication in a wireless communication LAN or the like. In the case of the mobile terminal 100, by using a handover, the user can realize wireless communication using the wireless communication unit 211 with a simple operation. Specifically, the wireless communication unit 211 can connect to the access point 120 using connection information (the SSID of the access point 120 and a security key) that the near field wireless communication unit 210 obtained from the NFC tag 111 of the MFP 110.

Figure 3:
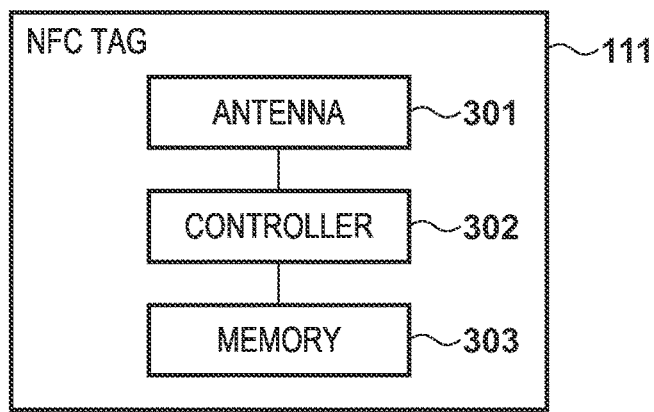
FIG. 3 is a diagram showing an example of a hardware configuration of an NFC tag.

The following describes an example of the hardware configuration of the NFC tag 111 with reference to FIG. 3. An antenna 301 is connected to a controller 302. The antenna 301 receives a supply of electrical power by electromagnetic induction from the near field wireless communication unit 210 of the mobile terminal 100, and uses the received electrical power as operating power for the controller 302. Additionally, the antenna 301 operates as an antenna for wireless communication from the near field wireless communication unit 210. The controller 302 performs communication with the mobile terminal 100 via the antenna 301. Additionally, the controller 302 performs reading/writing processing with respect to a memory 303 in accordance with a reading/writing instruction received by this communication. By performing this reading/writing processing, the controller 302 can hold information regarding the MFP 110, such as the MAC address thereof, and notify this information to an external apparatus via the antenna 301 as necessary.

Software Configuration

Figure 4:
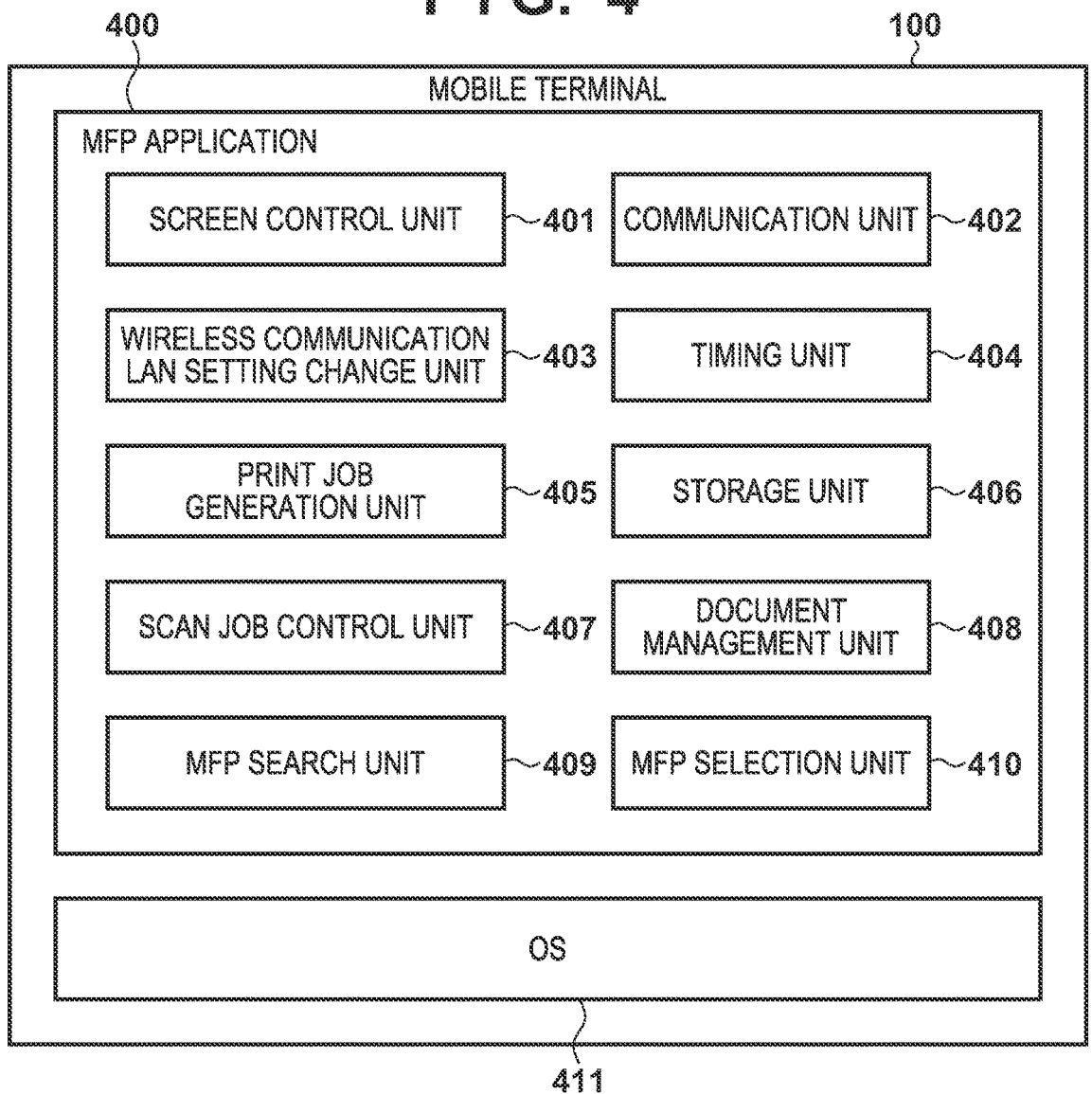
FIG. 4 is a diagram showing an example of a software configuration of the mobile terminal.

The following describes an example of the software configuration of the mobile terminal 100 with reference to FIG. 4. FIG. 4 is a functional block diagram of software realized by the CPU 201 reading out a control program stored in the ROM 202 or the HDD 204.

The OS 411 is software for controlling overall operations of the mobile terminal 100. Various applications, including the MFP application 400, can be installed in the mobile terminal 100. The OS 411 exchanges information with these applications, and executes various types of processing in accordance with instructions received from the applications. For example, the OS 411 changes the screen displayed on the operation panel 206, and executes wireless communication using the wireless communication unit 211.

The MFP application 400 is an application installed in the mobile terminal 100. The user can perform operations and issue instructions for printing, scanning, and the like with respect to the MFP 110 from the MFP application 400. Various applications other than the MFP application 400 can be installed in the mobile terminal 100, but they will not be described here.

Figure 5:
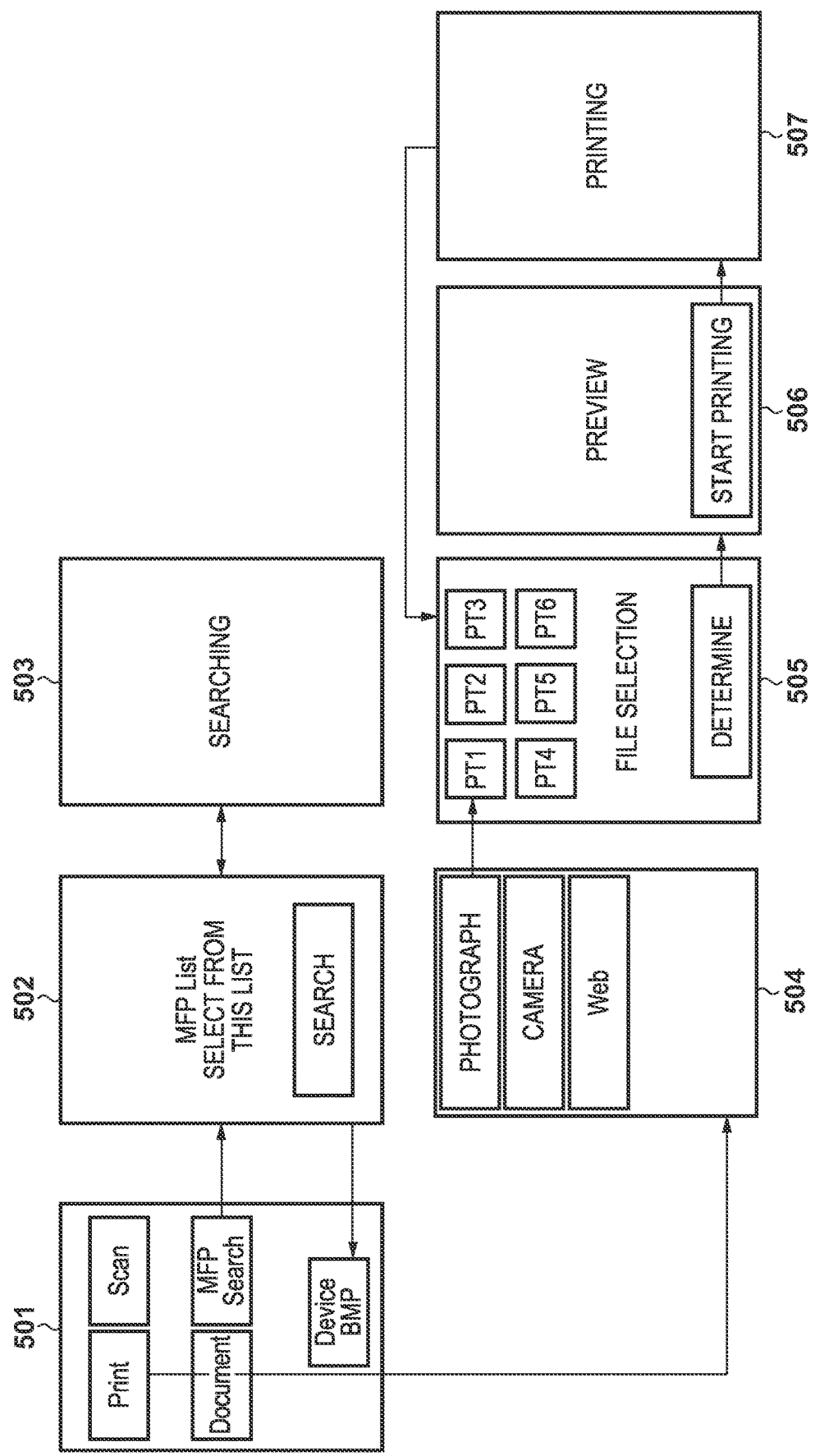
FIG. 5 is a diagram showing a flow of screens according to a first embodiment.

The following is a more detailed description of units configuring the MFP application 400. A screen control unit 401 controls the screens displayed on the operation panel 206 via the OS 411. The screens shown in FIG. 5 are displayed on the operation panel 206 by the screen control unit 401. Also, the screen control unit 401 makes a determination regarding operations and instructions input by the user via the operation panel 206. A communication unit 402 controls wireless communication performed by the wireless communication unit 211 and near field wireless communication performed by the near field wireless communication unit 210 via the OS 411. A wireless communication LAN setting change unit 403 changes wireless communication LAN settings related to wireless communication performed by the mobile terminal 100, via the OS 411. A timing unit 404 measures time using the RTC 205.

A print job generation unit 405 generates print jobs. A print job generated by the print job generation unit 405 is sent to the MFP 110 by the wireless communication unit 211, and thereafter, printing is executed on the MFP 110 side in accordance with the print job. A storage unit 406 temporarily stores various information.

A scan job control unit 407 issues a scan instruction to the MFP 110 using the wireless communication unit 211, and displays scan data received from the MFP 110 via the screen control unit 401. In the case of storing scan data, the scan job control unit 407 stores it in the storage unit 406. Stored scan data is managed by a document management unit 408.

An MFP search unit 409 sends a search command over a network via the wireless communication unit 211, and displays a list of corresponding MFPs based on received response data. An MFP selection unit 410 selects an MFP that is to perform an operation from the list of found MFPs, and stores information indicating the selected MFP in the storage unit 406. The MFP selection unit 410 also stores a list of MFPs that have been selected in the past.

Screen Transitions

Next, screen transitions and an overview of the print function realized by the MFP application 400 will be described with reference to FIG. 5. The screens shown in FIG. 5 are screens displayed on the operation panel 206 by the screen control unit 401 of the MFP application 400.

A home screen 501 is the screen that is first displayed when the MFP application 400 starts up. A DeviceBMP is arranged on the home screen 501 to display the MFP that is currently selected. Buttons corresponding to various functions are also displayed on the home screen 501. When the search button is selected, the display transitions to an MFP selection screen 502, and the MFP selected in the MFP selection screen 502 is displayed by the DeviceBMP.

When a print button is selected, the display transitions to a print type selection screen 504 for performing an operation on the MFP that is currently selected. When a scan button is selected, the display transitions to a scan setting screen (not shown), and it is possible to set scan settings, execute scanning, view a data preview, and so on. When a document button is selected, the display transitions to a document selection screen (not shown), and it is possible to manage (move, delete, preview) image data stored by the application.

A list of MFPs registered in the MFP application 400 is displayed on the MFP selection screen 502. When an MFP is selected from the list, the display transitions to the home screen 501, and the selected MFP is displayed by the DeviceBMP. When a search button is selected on the MFP selection screen 502, the display transitions to a searching screen 503.

In the searching screen 503, an MFP search is executed, and when the search is complete, a list of found MFPs is displayed. When an MFP is selected from the list of found MFPs, the display transitions to the MFP selection screen 502, and the selected MFP is added to the list of MFPs on the MFP selection screen 502.

The print type selection screen 504 displays types of printing in a selectable manner. Here, the types of printing "photograph", "camera", and "web" are displayed, but there is no limitation to these types. If "photograph" is selected, the display transitions to an image selection screen 505. If "camera" is selected, the display transitions to an image capturing screen (not shown), and print processing is performed on a captured image. If "web" is selected, a web browser screen (not shown) is displayed. When a URL (Uniform Resource Locator) is input in the web browser screen, the web page at the input URL is displayed, and print processing is performed on the displayed web page.

The image selection screen 505 is a screen that displays a list of photographs stored in the HDD 204 of the mobile terminal 100. As one example, the image selection screen 505 shows the case where six photographs, namely photographs PT1 to PT6, are displayed. In the image selection screen 505, the user selects a photograph that is to be printed.

When a photograph is selected in the image selection screen 505, a preview screen 506 is displayed. A preview of the selected image is displayed on the preview screen 506, and since the selected photograph is displayed at a large size, the user can check the selected photograph. When a print start button is selected in the preview screen 506, a print instruction is issued, and the display transitions to a currently printing screen 507. The currently printing screen 507 is displayed while printing is underway, and then the display returns to the image selection screen 505 when printing is complete.

If the user brings the mobile terminal 100 close to the NFC tag 111 of the MFP 110 while the preview screen 506 is being displayed, the near field wireless communication unit 210 reads the information stored in the NFC tag 111 of the MFP 110. In the case of the present embodiment, connection information for the execution of wireless communication with the MFP 110 by the wireless communication unit 211 is stored in the NFC tag 111 of the MFP 110. This connection information corresponds to the SSID of the access point 120, a security key for connecting to the access point 120, and the IP address of the MFP 110. Using the connection information obtained by the near field wireless communication unit 210 reading the NFC tag 111 of the MFP 110, the wireless communication unit 211 can perform wireless communication with the MFP 110, and printing can be executed.

If the mobile terminal 100 is brought close to the NFC tag 111 while a screen other than the preview screen 506 is being displayed, printing fails because there are also screens in which the image data to be printed has not been determined. As a result, processing ends with an error depending on the case.

In view of this, when the mobile terminal 100 is brought close to the NFC tag 111 of the MFP 110 (in other words, when the near field wireless communication unit 210 obtains connection information from the NFC tag 111), print processing is executed based on the connection information if a preview screen is being displayed. However, if a preview screen is not being displayed, only a switch to wireless communication LAN communication (handover) and MFP selection (pairing) are performed. Accordingly, printing can be performed based on connection information obtained from the NFC tag 111, only when printing is possible.

Processing Flow

Figure 6:
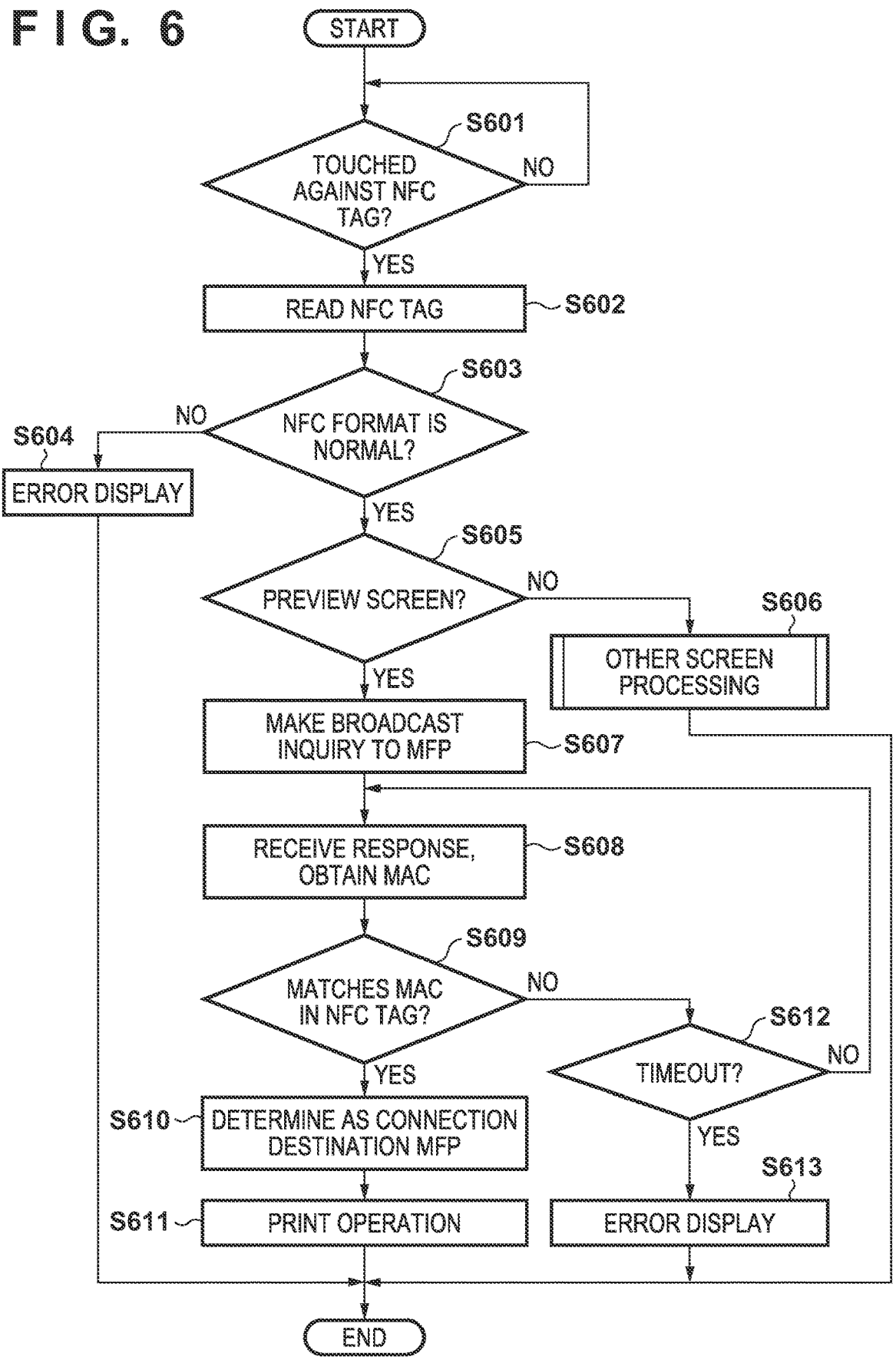
FIG. 6 is a flowchart showing processing in the case of a preview screen according to the first embodiment.
Figure 7:
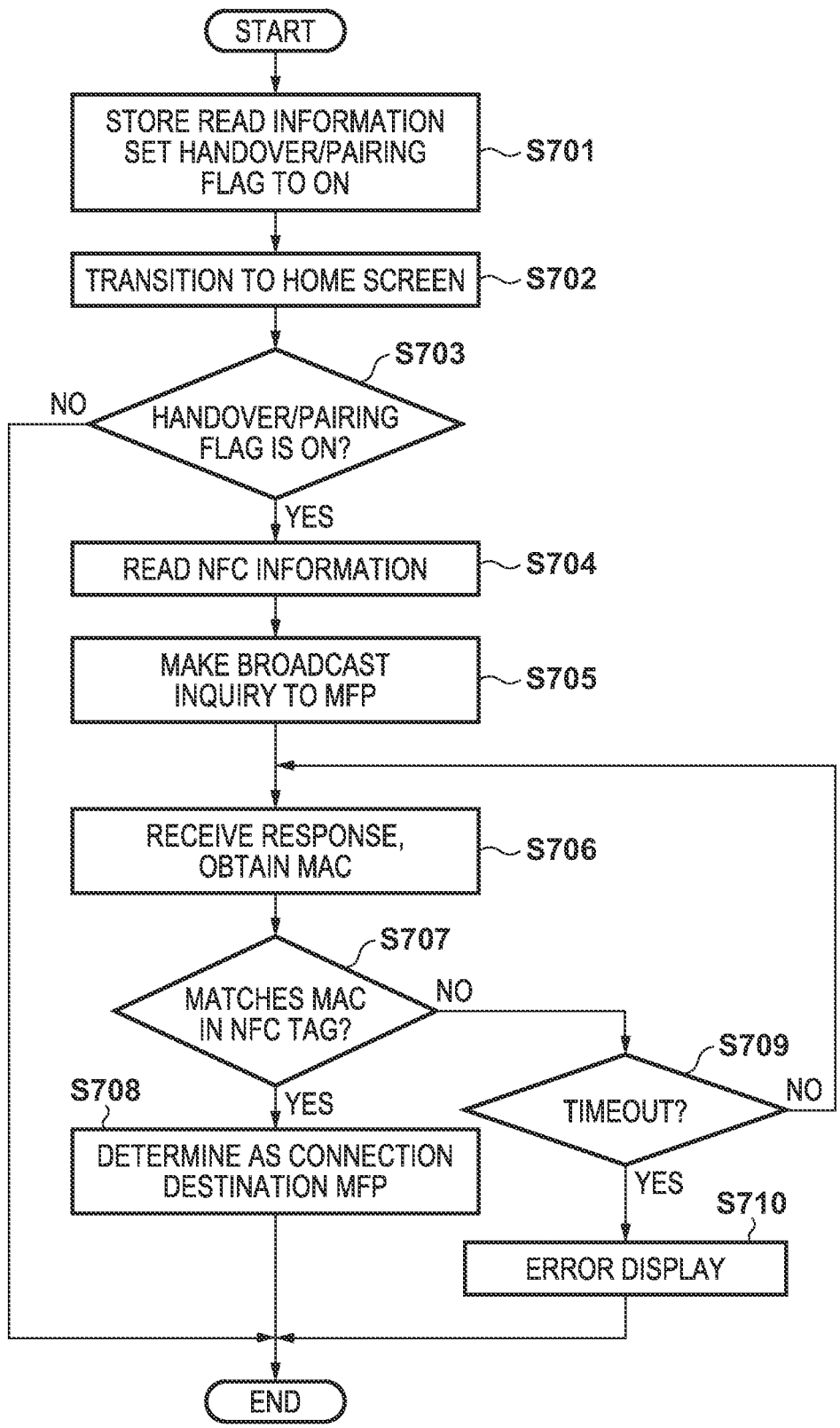
FIG. 7 is a flowchart showing processing in the case of a screen other than a preview screen according to the first embodiment.

The following describes processing executed by the MFP application 400 when an NFC touch is performed while a preview screen is being displayed, with reference to the flowcharts of FIGS. 6 and 7. The steps shown in the flowchart of FIG. 6 are realized by the CPU 201 of the mobile terminal 100 deploying a control program stored in a memory such as the ROM 202 to the RAM 203 and executing the control program.

In step S601, the CPU 201 uses the near field wireless communication unit 210 to determine whether or not the operator of the mobile terminal 100 has touched the NFC tag 111. If a touch has been performed (YES in step S601), the procedure moves to step S602. If a touch has not been performed (NO in step S601), the procedure waits until a touch is performed.

In step S602, the CPU 201 uses the near field wireless communication unit 210 to read the data recorded in the NFC tag 111 that was touched.

In step S603, the CPU 201 checks whether or not the format of the data read in step S602 is normal. If the read data is improper, reading fails, or the format is improper (NO in step S603), in step S604, the CPU 201 notifies the operator by displaying an error display (not shown) on the operation panel 206. Thereafter, this processing flow is ended. On the other hand, if the format is normal (YES in step S603), the procedure moves to step S605.

In step S605, the CPU 201 determines whether or not the screen of the MFP application 400 is a preview screen. In the case of a preview screen (YES in step S605), the procedure moves to step S607, and otherwise (NO in step S605) the procedure moves to step S606. In step S606, the CPU 201 performs an operation for the case of a screen other than a preview screen. The operation in the case of a screen other than a preview screen will described later with reference to FIG. 7.

In step S607, the CPU 201 uses the wireless communication unit 211 to, using a broadcast packet, make an MFP existence inquiry to the MFPs that are connected via the access point 120.

In step S608, the CPU 201 uses the wireless communication unit 211 to receive a response packet from an MFP. The CPU 201 then uses SNMP (Simple Network Management Protocol) to make an MFP MAC address inquiry to the MFP, and receives a response to the inquiry. Note that although the CPU 201 obtains the MAC address of the MFP via SNMP, there is no limitation to this. For example, a configuration is possible in which a MAC address table (ARP table) of the OS 411 is searched, and the corresponding MAC address is obtained based on the IP address indicated in the response packet.

In step S609, the CPU 201 compares the MAC address that was obtained in step S608 with the MAC address described in the NFC tag 111 that was read in step S602. In the case of a match (YES in step S609), the procedure moves to step S610. In the case of no match (NO in step S609), the procedure moves to step S612.

In step S610, the CPU 201 considers the IP address of the MFP that sent the response in step S608 to be the IP address of the MFP 110 to which the NFC tag 111 is attached. The CPU 201 then determines that IP address to be the print destination.

In step S611, the CPU 201 performs print processing with respect to the IP address that was determined in step S610. Specifically, the CPU 201 considers, as the print target, a file determined based on a file selection operation (not shown) performed by the operator, and makes a print processing request to the MFP 110 that corresponds to the IP address that was determined in step S610.

In step S612, the CPU 201 calculates an elapsed duration from step S607 using the timing unit 404, and determines whether or not the elapsed duration is greater than or equal to a predetermined value (e.g., greater than or equal to 10 seconds). If the elapsed duration exceeds the predetermined value (YES in step S612), it is considered that a timeout occurred, and the procedure moves to step S613. If the elapsed duration does not exceed the predetermined value (NO in step S612), the procedure returns to step S608.

In step S613, the CPU 201 notifies the operator by displaying an error display (not shown) on the operation panel 206 to indicate that the MFP written in the NFC tag 111 could not be found. Thereafter, this processing flow is ended.

The following describes processing in the case where the screen of the MFP application 400 is not a preview, with reference to the flowchart of FIG. 7. This processing flow corresponds to step S606 in FIG. 6.

In step S701, the CPU 201 stores the MAC address that was read in step S602 in the HDD 204. Also, the CPU 201 sets the value of a handover/pairing flag to "ON", and stores the flag in the HDD 204. In the present embodiment, the handover/pairing flag indicates a setting of whether or not communication with a connection destination apparatus (target) is to be established. If the value of this flag is "ON", a connection is made with the detected connection destination. In step S702, in order to reset the processing at this point, the CPU 201 restarts the MFP application 400 and transitions the screen of the MFP application 400 to the home screen 501. Note that as long as it is possible to reset the processing, the screen may be transitioned to the home screen 501 without restarting the MFP application 400.

In step S703, the CPU 201 determines whether or not the value of the handover/pairing flag stored in the HDD 204 is "ON". If the value of the handover/pairing flag is "OFF" (NO in step S703), the CPU 201 determines that normal processing of the home screen 501 is to be performed. Note that there are no particular limitations on the details of this, and therefore a detailed description will not be given. Thereafter, this processing flow is ended. If the value of the handover/pairing flag is "ON" (YES in step S703), the procedure moves to step S704.

In step S704, the CPU 201 reads the MAC address that was stored in step S701. In step S705, the CPU 201 uses the wireless communication unit 211 to, using a broadcast packet, make an MFP existence inquiry to the MFPs that are connected via the access point 120.

In step S706, the CPU 201 uses the wireless communication unit 211 to receive a response packet from an MFP. The CPU 201 then uses SNMP to make an MFP MAC address inquiry to that MFP, and receives a response to the inquiry. Note that although the CPU 201 obtains the MAC address of the MFP via SNMP, there is no limitation to this, and the corresponding MAC address may be obtained by searching a MAC address table (ARP table) of the OS 411, for example.

In step S707, the CPU 201 compares the MAC address that was obtained in step S706 with the MAC address described in the NFC tag 111 that was read in step S704. In the case of a match (YES in step S707), the procedure moves to step S708. In the case of no match (NO in step S707), the procedure moves to step S709.

In step S708, the CPU 201 considers the IP address of the MFP that sent the response in step S706 to be the IP address of the MFP 110 to which the NFC tag 111 is attached. The CPU 201 then determines that IP address to be the connection destination.

In step S709, the CPU 201 calculates an elapsed duration from step S705 using the timing unit 404, and determines whether or not the elapsed duration is greater than or equal to a predetermined value (e.g., greater than or equal to 10 seconds). If the elapsed duration exceeds the predetermined value (YES in step S709), it is considered that a timeout occurred, and the procedure moves to step S710. If the elapsed duration does not exceed the predetermined value (NO in step S709), the procedure returns to step S706.

In step S710, the CPU 201 notifies the operator by displaying an error display (not shown) on the operation panel 206 to indicate that the MFP written in the NFC tag 111 could not be found. Thereafter, this processing flow is ended.

Effects

As described above, when the mobile terminal is brought close to the NFC tag of an MFP, printing is executed if the MFP application is displaying an image preview screen, and only handover and pairing are executed if another screen is being displayed.

Accordingly, when a preview is being displayed, the user can easily perform printing, and when a screen other than a preview screen is being displayed, the user can select an MFP by touching the mobile terminal against an NFC without particularly giving consideration to which screen is being displayed, and then smoothly perform operations with respect to the MFP.

Second Embodiment

Whereas the first embodiment describes an example in which the predetermined screen is a preview screen of the MFP application, a second embodiment describes processing performed when another screen is being displayed. Specifically, a configuration is possible in which if an NFC touch is performed while an MFP search screen is being displayed, the search is ended, and the MFP on which the NFC touch was performed is selected. Examples of MFP search screens include the MFP selection screen 502 and the searching screen 503 shown in FIG. 5.

Processing Flow

Figure 8:
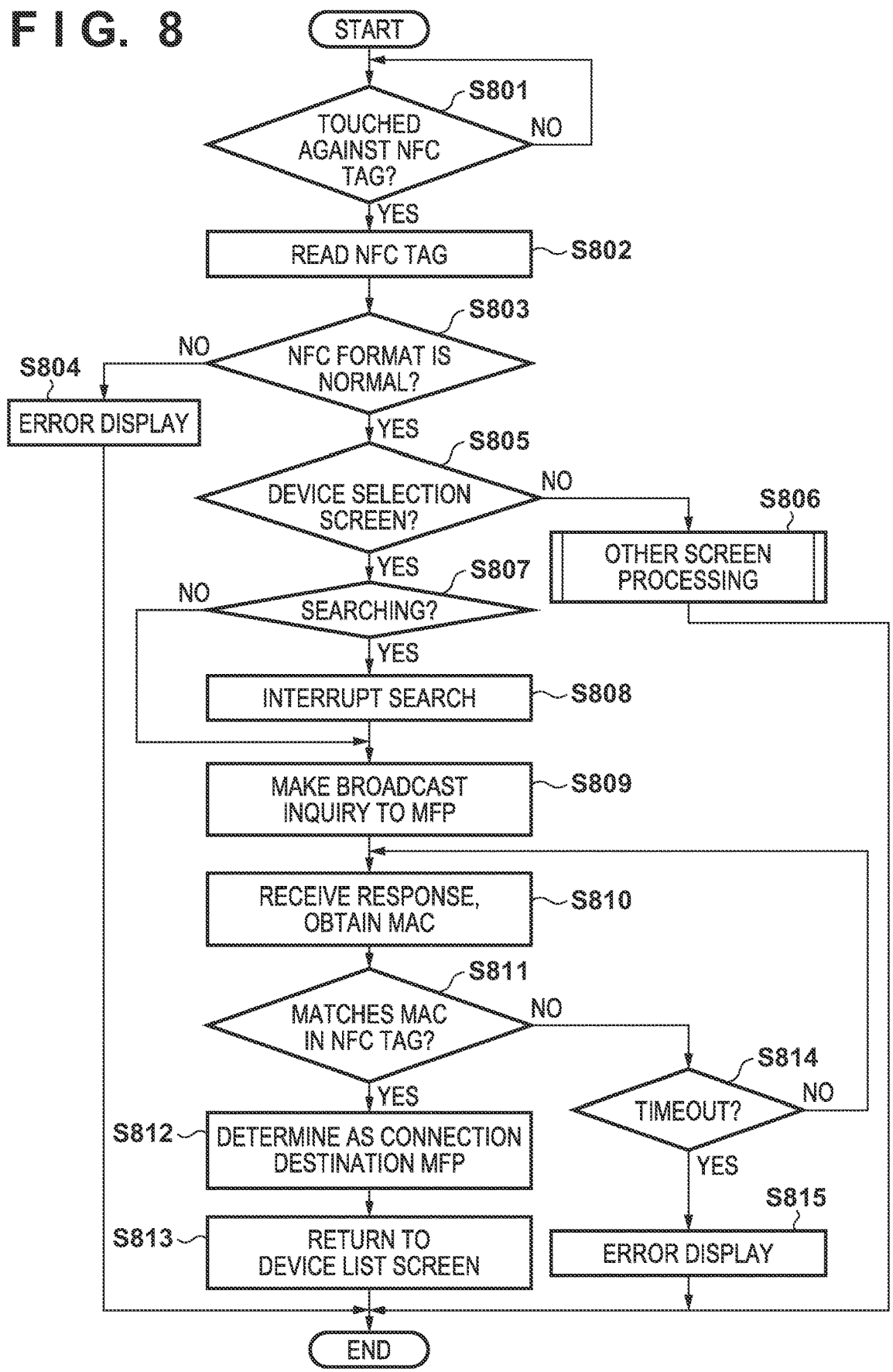
FIG. 8 is a flowchart showing processing in the case of a device search screen according to a second embodiment.

The following describes processing executed by the MFP application 400 when an NFC touch is performed while an MFP search screen is being displayed, with reference to the flowchart of FIG. 8. The steps shown in the flowchart of FIG. 8 are realized by the CPU 201 of the mobile terminal 100 deploying a control program stored in a memory such as the ROM 202 to the RAM 203 and executing the control program.

In step S801, the CPU 201 uses the near field wireless communication unit 210 to determine whether or not the operator of the mobile terminal 100 has touched the NFC tag 111. If a touch has been performed (YES in step S801), the procedure moves to step S802. If a touch has not been performed (NO in step S801), the procedure waits until a touch is performed.

In step S802, the CPU 201 uses the near field wireless communication unit 210 to read the data recorded in the NFC tag 111 that was touched.

In step S803, the CPU 201 checks whether or not the format of the data read in step S802 is normal. If the read data is improper, reading fails, or the format is improper (NO in step S803), in step S804, the CPU 201 notifies the operator by displaying an error display (not shown) on the operation panel 206. Thereafter, this processing flow is ended. On the other hand, if the format is normal (YES in step S803), the CPU 201 moves to step S805.

In step S805, the CPU 201 determines whether or not the screen of the MFP application 400 is an MFP search screen. In the case of an MFP search screen (YES in step S805), the procedure moves to step S807, and otherwise (NO in step S805) the procedure moves to step S806. In step S806, the CPU 201 performs an operation for the case of a screen other than an MFP search screen. Thereafter, this processing flow is ended.

In step S807, the CPU 201 determines whether or not the screen of the MFP application 400 is the searching screen 503. In the case of the MFP searching screen (YES in step S807), the procedure moves to step S808, and in the case of the MFP list screen (NO in step S807), the procedure moves to step S809.

In step S808, the CPU 201 interrupts the search processing. In step S809, the CPU 201 uses the wireless communication unit 211 to, using a broadcast packet, make an MFP existence inquiry to the MFPs that are connected via the access point 120.

In step S810, the CPU 201 uses the wireless communication unit 211 to receive a response packet from an MFP. The CPU 201 then uses SNMP to make an MFP MAC address inquiry to that MFP, and receives a response to the inquiry. Note that although the CPU 201 obtains the MAC address of the MFP via SNMP, there is no limitation to this, and the corresponding MAC address may be obtained by searching a MAC address table (ARP table) of the OS 411, for example.

In step S811, the CPU 201 compares the MAC address that was obtained in step S810 with the MAC address described in the NFC tag 111 that was read in step S802. In the case of a match (YES in step S811), the procedure moves to step S812. In the case of no match (NO in step S811), the procedure moves to step S814.

In step S812, the CPU 201 considers the IP address of the MFP that sent the response in step S810 to be the IP address of the MFP 110 to which the NFC tag 111 is attached. The CPU 201 then determines that IP address to be the connection destination.

In step S813, the CPU 201 returns the screen of the MFP application 400 to the MFP selection screen 502. Thereafter, this processing flow is ended.

In step S814, the CPU 201 calculates an elapsed duration from step S809 using the timing unit 404, and determines whether or not the elapsed duration is greater than or equal to a predetermined value (e.g., greater than or equal to 10 seconds). If the elapsed duration exceeds the predetermined value (YES in step S814), it is considered that a timeout occurred, and the procedure moves to step S815. If the elapsed duration does not exceed the predetermined value (NO in step S814), the procedure returns to step S810.

In step S815, the CPU 201 notifies the operator by displaying an error display (not shown) on the operation panel 206 to indicate that the MFP written in the NFC tag 111 could not be found. Thereafter, this processing flow is ended.

Effects

As described above, when the mobile terminal is brought close to the NFC tag of an MFP, if the MFP application is displaying an MFP search screen, that MFP can be immediately selected without waiting for the completion of search processing. Accordingly, the user can shorten the search time, and can select a desired MFP without getting lost in an MFP list.

Third Embodiment

This embodiment describes the case where an NFC touch is performed while the screen of the MFP application being displayed is a screen in which communication is being performed with an MFP during scanning, printing, or the like. When an NFC touch is performed in this state, the job will be interrupted if pairing is performed, and therefore pairing does not need to be performed during communication.

Processing Flow

Figure 9:
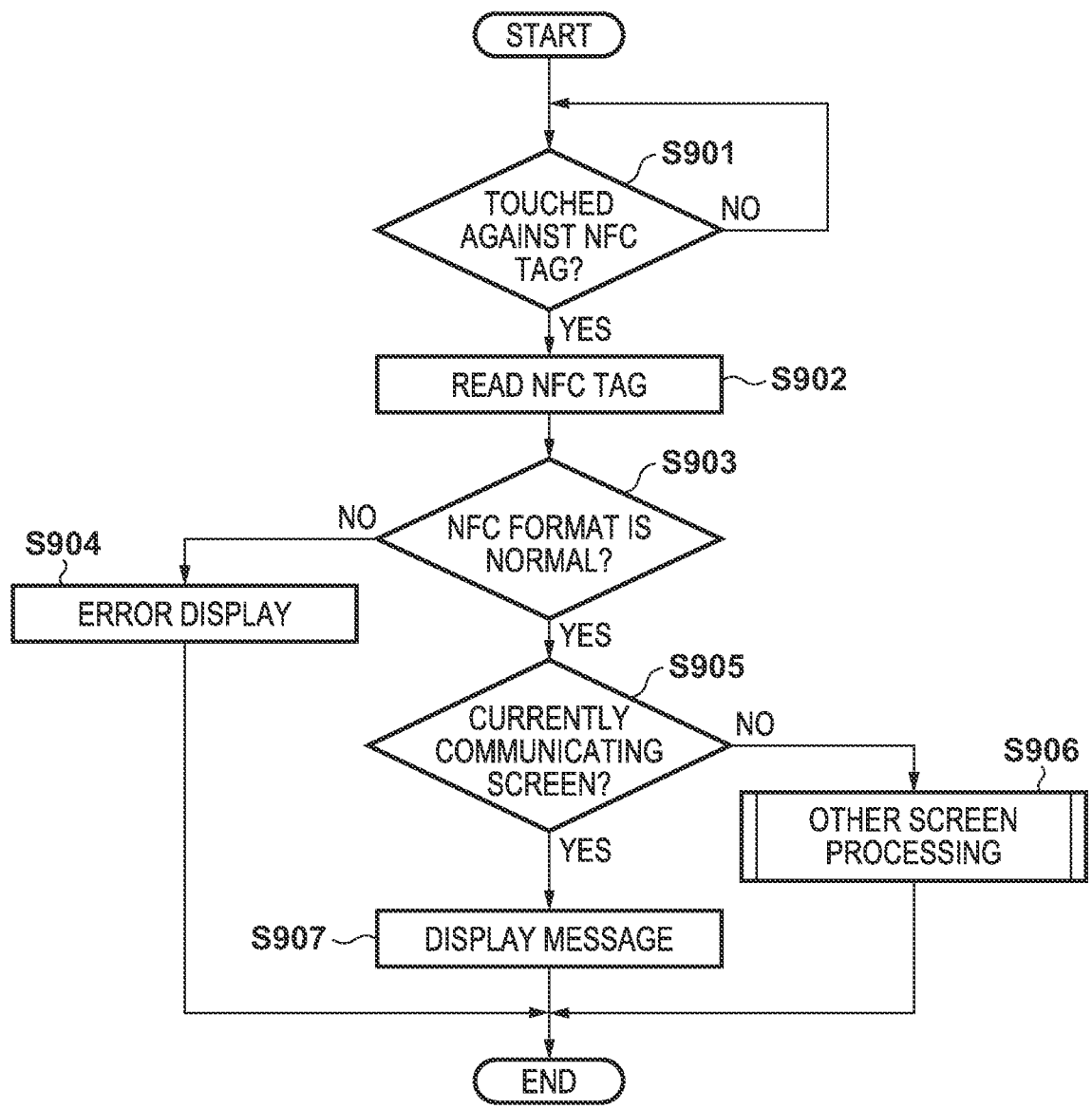
FIG. 9 is a flowchart showing processing in the case of a currently communicating screen according to a third embodiment.

The following describes processing executed by the MFP application 400 when an NFC touch is performed in the case where a sending print job screen is being displayed, with reference to the flowchart of FIG. 9. The steps shown in the flowchart of FIG. 9 are realized by the CPU 201 of the mobile terminal 100 deploying a control program stored in a memory such as the ROM 202 to the RAM 203 and executing the control program.

In step S901, the CPU 201 uses the near field wireless communication unit 210 to determine whether or not the operator of the mobile terminal 100 has touched the NFC tag 111. If a touch has been performed (YES in step S901), the procedure moves to step S902. If a touch has not been performed (NO in step S901), the procedure waits until a touch is performed.

In step S902, the CPU 201 uses the near field wireless communication unit 210 to read the data recorded in the NFC tag 111 that was touched.

In step S903, the CPU 201 checks whether or not the format of the data read in step S902 is normal. If the read data is improper, reading fails, or the format is improper (NO in step S903), in step S904, the CPU 201 notifies the operator by displaying an error display (not shown) on the operation panel 206. Thereafter, this processing flow is ended. On the other hand, if the format is normal (YES in step S903), the procedure moves to step S905.

In step S905, the CPU 201 determines whether or not the screen of the MFP application 400 is a currently communicating screen. In the case of a currently communicating screen (YES in step S905), the procedure moves to step S907. In the case of another screen (NO in step S905), the procedure moves to step S906. In step S906, the CPU 201 performs an operation for the case of a screen other than a currently communicating screen. Thereafter, this processing flow is ended.

In step S907, the CPU 201 displays a message indicating that pairing could not be performed (not shown). Thereafter, this processing flow is ended.

Effects

As described above, when the mobile terminal is brought close to the NFC tag of an MFP, if the MFP application is displaying a currently communicating screen, no NFC processing is executed. Accordingly, the user can prevent an unintended interruption in a job currently being sent.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-146299, filed Jul. 16, 2014, which is hereby incorporated by reference herein in its entirety.

What is claimed is:

1. A method to be performed by executing an application in an information processing apparatus having a Near Field Communication (NFC) interface and being capable of establishing communication with a printer by using an NFC method via the NFC interface, the method comprising:

in a case where first data is received by the information processing apparatus using the established communication, the first data satisfying a predetermined condition, searching for the printer identified by the first data by using another communication method that is different from the NFC method and performing communication with the printer using the another communication method; and in a case where second data is received by the information processing apparatus using the established communication, the second data to be determined not to satisfy the predetermined condition, providing an error about the second data without searching for the printer by using the another communication method.

2. The method according to claim 1, wherein the first data that is determined to satisfy the predetermined condition includes an address identifying the printer.

3. The method according to claim 2, wherein the address identifying the printer is an Internet Protocol address of the printer.

4. The method according to claim 1, wherein the first data that is determined to satisfy the predetermined condition includes an address identifying the printer and connection information for connecting to an access point.

5. The method according to claim 4, wherein the communication by using the another communication method that is different from the NFC method is performed by processing that includes (1) a connection between the access point and the information processing apparatus that is established based on the connection information and (2) communication with the printer that is performed by using the another communication method via the connected access point.

6. The method according to claim 4, wherein the another communication method is a wireless communication capable of communicating to the access point.

7. The method according to claim 6, wherein the wireless communication connects to a Local Area Network (LAN).

8. The method according to claim 1, wherein the error is provided on a panel of the information processing apparatus, and wherein the panel is able to receive touch operations from a user of the information processing apparatus.

9. The method according to claim 1, wherein the first data and the second data are received from the printer by reading data stored in an NFC tag of the printer via the NFC interface.

10. The method according to claim 1, further comprising issuing a scan instruction to the found printer having a scanner by the communication using the another communication method, and receiving scan data, from the printer by the communication using the another communication method.

11. The method according to claim 1, further comprising sending print data to the printer by the communication using the another communication method.

12. The method according to claim 1, further comprising determining whether or not the first data that is received by using the established communication satisfies the predetermined condition before the communication is performed by using the another communication method.

13. The method according to claim 1, wherein the predetermined condition is satisfied in a case where data received by the information processing apparatus is proper.

14. The method according to claim 1, wherein the predetermined condition is satisfied in a case where a format of data received by the information processing apparatus is a predetermined format.

15. The method according to claim 1, wherein communication by using the another communication method that is different from the NFC method is not established in a case where the error about the second data is provided.

16. An information processing apparatus having a Near Field Communication (NFC) interface and being capable of establishing communication with a printer by using an NFC method via the NFC interface, the information processing apparatus comprising:
   at least one memory that stores a set of instructions related to an application; and
   at least one processor that executes the instructions, the instructions, when executed by the at least one processor, causing the information processing apparatus to perform operations comprising:
      in a case where first data is received by the information processing apparatus using the established communication, the first data satisfying a predetermined condition, searching for the printer identified by the first data by using the another communication method that is different from the NFC method and performing communication with the printer using the another communication method; and
      in a case where second data is received by the information processing apparatus using the established communication, the second data to be determined not to satisfy the predetermined condition, providing an error about the second data without searching for the printer by using the another communication method.

17. The information processing apparatus according to claim 16, wherein the first data that is determined to satisfy the predetermined condition includes an address identifying the printer.

18. The information processing apparatus according to claim 17, wherein the address identifying the printer is an Internet Protocol address of the printer.

19. The information processing apparatus according to claim 16, wherein the first data that is determined to satisfy the predetermined condition includes an address identifying the printer and connection information for connecting to an access point.

20. The information processing apparatus according to claim 19, wherein the communication by using the another communication method that is different from the NFC method is performed by processing that includes (1) a connection between the access point and the information processing apparatus that is established based on the connection information and (2) communication with the printer that is performed by using the another communication method via the connected access point.

21. The information processing apparatus according to claim 19, wherein the another communication method is a wireless communication capable of communicating to the access point.

22. The information processing apparatus according to claim 21, wherein the wireless communication connects to a Local Area Network (LAN).

23. The information processing apparatus according to claim 16, wherein the error is provided on a panel of the information processing apparatus, and wherein the panel is able to receive touch operations from a user of the information processing apparatus.

24. The information processing apparatus according to claim 16, wherein the first data and the second data are received from the printer by reading data stored in an NFC tag of the printer via the NFC interface.

25. The information processing apparatus according to claim 16, wherein the operations further comprise issuing a scan instruction to the found printer having a scanner by the communication using the another communication method, and receiving scan data, from the printer by the communication using the another communication method.

26. The information processing apparatus according to claim 16, wherein the operations further comprise sending print data to the printer by the communication via using the another communication method.

27. The information processing apparatus according to claim 16, wherein the operations further comprise determining whether or not the first data that is received by using the established communication satisfies the predetermined condition before the communication is performed by using the another communication method.

28. The information processing apparatus according to claim 16, wherein the predetermined condition is satisfied in a case where data received by the information processing apparatus is proper.

29. The information processing apparatus according to claim 16, wherein the predetermined condition is satisfied in a case where a format of data received by the information processing apparatus is a predetermined format.

30. The information processing apparatus according to claim 16, wherein
   communication by using the another communication method that is different from the NFC method is not established in a case where the error about the second data is provided.

31. A non-transitory storage medium storing instructions that, when executed by at least one processor cause an information processing apparatus having a Near Field Communication (NFC) interface and being capable of establishing a communication with a printer by using an NFC method via the NFC interface, to perform operations comprising:
   in a case where first data is received by the information processing apparatus using the established communication, the first data satisfying a predetermined condition, searching for the printer identified by the first data by using the another communication method that is different from the NFC method and performing communication with the printer using the another communication method; and
   in a case where second data is received by the information processing apparatus using the established communication, the second data to be determined not to satisfy the predetermined condition, providing an error about the second data without searching for the printer by using the another communication method.

32. The non-transitory storage medium according to claim 31, wherein the first data that is determined to satisfy the predetermined condition includes an address identifying the printer.

33. The non-transitory storage medium according to claim 32, wherein the address identifying the printer is an Internet Protocol address of the printer.

34. The non-transitory storage medium according to claim 31, wherein the first data that is determined to satisfy the predetermined condition includes an address identifying the printer and connection information for connecting to an access point.

35. The non-transitory storage medium according to claim 34, wherein the communication by using the another communication method that is different from the NFC method is performed by processing that includes (1) a connection between the access point and the information processing apparatus that is established based on the connection information and (2) communication with the printer that is performed by using the another communication method via the connected access point.

36. The non-transitory storage medium according to claim 34, wherein the another communication method is a wireless communication capable of communicating to the access point.

37. The non-transitory storage medium according to claim 36, wherein the wireless communication connects to a Local Area Network (LAN).

38. The non-transitory storage medium according to claim 31, wherein the error is provided on a panel of the information processing apparatus, and
wherein the panel is able to receive touch operations from a user of the information processing apparatus.

39. The non-transitory storage medium according to claim 31, wherein the first data and the second data are received from the printer by reading data stored in an NFC tag of the printer via the NFC interface.

40. The non-transitory storage medium according to claim 31, wherein the operations further comprise issuing a scan instruction to the found printer having a scanner by the communication using the another communication method, and receiving scan data, from the printer by the communication using the another communication method.

41. The non-transitory storage medium according to claim 31, wherein the operations further comprise sending print data to the printer by the communication using the another communication method.

42. The non-transitory storage medium according to claim 31, wherein the operations further comprise determining whether or not the first data that is received by using the established communication satisfies the predetermined condition before the communication is performed by using the another communication method.

43. The non-transitory storage medium according to claim 31, wherein the predetermined condition is satisfied in a case where data received by the information processing apparatus is proper.

44. The non-transitory storage medium according to claim 31, wherein the predetermined condition is satisfied in a case where a format of data received by the information processing apparatus is a predetermined format.

45. The non-transitory storage medium according to claim 31, wherein communication by using the another communication method that is different from the NFC method is not established in a case where the error about the second data is provided.

46. A method to be performed by executing an application in an information processing apparatus having a Near Field Communication (NFC) interface and being capable of establishing a communication with a printer by using an NFC method via the NFC interface, the method comprising:
in a case where first data is received by the information processing apparatus using the established communication, the first data satisfying a predetermined condition, specifying and communicating with the printer identified by the first data by using another communication method that is different from the NFC method; and
in a case where second data is received by the information processing apparatus using the established communication, the second data to be determined not to satisfy the predetermined condition, providing an error about the second data without specifying the printer by using the another communication method.

47. A method to be performed by executing an application in an information processing apparatus having a Near Field Communication (NFC) interface and being capable of establishing a communication with a printer by using an NFC method via the NFC interface, the method comprising:
determining whether or not data received by the information processing apparatus by using the established communication satisfies a predetermined condition;
in a case where it is determined that the data received by the information processing apparatus satisfies the predetermined condition, searching for the printer identified by the data by using another communication method that is different from the NFC method, and performing communication with the printer found in the search by using the another communication method that is different from the NFC method; and
in a case where it is determined that the data received by the information processing apparatus does not satisfy the predetermined condition, providing an error about the data.

48. An information processing apparatus having a Near Field Communication (NFC) interface and being capable of establishing a communication with a printer by using an NFC method via the NFC interface, the information processing apparatus comprising:
at least one memory that stores a set of instructions related to an application; and
at least one processor that executes the instructions, the instructions, when executed by the at least one processor, causing the information processing apparatus to perform operations comprising:
in a case where first data is received by the information processing apparatus using the established communication, the first data satisfying a predetermined condition, specifying and communicating with the printer identified by the first data by using another communication method that is different from the NFC method; and
in a case where second data is received by the information processing apparatus using the established communication, the second data to be determined not to satisfy the predetermined condition, providing an error about the second data without specifying the printer by using the another communication method.

49. An information processing apparatus having a Near Field Communication (NFC) interface and being capable of establishing a communication with a printer by using an NFC method via the NFC interface, the information processing apparatus comprising:
at least one memory that stores a set of instructions related to an application; and
at least one processor that executes the instructions, the instructions, when executed by the at least one processor, causing the information processing apparatus to perform operations comprising:
determining whether or not data received by the information processing apparatus by using the established communication satisfies a predetermined condition;

in a case where it is determined that the data received by the information processing apparatus satisfies the predetermined condition, searching for the printer identified by the data by using another communication method that is different from the NFC method, and performing communication with the printer found in the search by using the another communication method that is different from the NFC method; and in a case where it is determined that the data received by the information processing apparatus does not satisfy the predetermined condition, providing an error about the data.

50. A non-transitory storage medium storing instructions, that, when executed by at least one processor cause an information processing apparatus having a Near Field Communication (NFC) interface and being capable of establishing a communication with a printer by using an NFC method via the NFC interface, to perform operations comprising:

in a case where first data is received by the information processing apparatus using the established communication, the first data satisfying a predetermined condition, specifying and communicating with the printer identified by the first data by using another communication method that is different from the NFC method; and in a case where second data is received by the information processing apparatus using the established communication, the second data to be determined not to satisfy the predetermined condition, providing an error about the second data without specifying the printer by using the another communication method.

51. A non-transitory storage medium storing instructions, A non-transitory storage medium storing instructions, that, when executed by at least one processor cause an information processing apparatus having a Near Field Communication (NFC) interface and being capable of establishing a communication with a printer by using an NFC method via the NFC interface, to perform operations comprising:

determining whether or not data received by the information processing apparatus by using the established communication satisfies a predetermined condition;

in a case where it is determined that the data received by the information processing apparatus satisfies the predetermined condition, searching for the printer identified by the data by using another communication method that is different from the NFC method, and performing communication with the printer found in the search by using the another communication method that is different from the NFC method; and in a case where it is determined that the data received by the information processing apparatus does not satisfy the predetermined condition, providing an error about the data.

* * * * *